(12) United States Patent
Vidudala et al.

(10) Patent No.: US 11,082,495 B1
(45) Date of Patent: Aug. 3, 2021

(54) METHOD AND SYSTEM FOR EFFICIENT CONTENT TRANSFER TO A SERVER

(71) Applicant: Open Text Holdings, Inc., San Mateo, CA (US)

(72) Inventors: Chinna Subbarayudu Vidudala, Bengaluru (IN); Pulla Rayudu Garaga, Bengaluru (IN); Ravikumar Akili, Bangalore (IN)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 0 days.

(21) Appl. No.: 16/842,090

(22) Filed: Apr. 7, 2020

(51) Int. Cl.
*H04L 29/08* (2006.01)
*H04L 29/06* (2006.01)

(52) U.S. Cl.
CPC .......... *H04L 67/1097* (2013.01); *H04L 67/42* (2013.01)

(58) Field of Classification Search
CPC .................................................. H04L 67/1097
USPC ....................................................... 709/236
See application file for complete search history.

(56) References Cited

U.S. PATENT DOCUMENTS

| 8,473,585 B1 | 6/2013 | Smith |
| 2010/0268902 A1 | 10/2010 | Drobychev |
| 2012/0089775 A1 | 4/2012 | Ranade |
| 2014/0304357 A1* | 10/2014 | Bestler ............... G06F 16/27 709/213 |
| 2014/0317060 A1 | 10/2014 | Shen |
| 2015/0163301 A1 | 6/2015 | Narayanan |
| 2015/0212900 A1* | 7/2015 | Hayasaka ........... G06F 11/1453 707/652 |
| 2016/0246538 A1 | 8/2016 | Vazhenin |
| 2020/0186588 A1 | 6/2020 | Xu |
| 2020/0371861 A1 | 11/2020 | Chen |
| 2021/0096759 A1 | 4/2021 | Thakkilapati |

OTHER PUBLICATIONS

Office Action for U.S. Appl. No. 16/586,581, dated Feb. 22, 2021, 19 pgs.

* cited by examiner

*Primary Examiner* — Adnan M Mirza
(74) *Attorney, Agent, or Firm* — Sprinkle IP Law Group

(57) ABSTRACT

A method comprising communicating with a server to store first content, communicating with the server comprising: establishing a first plurality of content transfer sessions with the server to transfer the first plurality of content chunks to the server for storage in the distributed data store as associated content of an object, including establishing at least two parallel content transfer sessions to transfer at least two of the content chunks from the first plurality of content chunks to the server in parallel; and transferring each content chunk from the first plurality of content chunks and chunk metadata for that content chunk to the server using a corresponding content transfer sessions from the first plurality of content transfer sessions, the chunk metadata including the chunk id for that chunk and an indication of the object to which the chunk is to be stored.

17 Claims, 8 Drawing Sheets

METHOD AND SYSTEM FOR EFFICIENT CONTENT TRANSFER TO A SERVER

TECHNICAL FIELD

This disclosure relates generally to data storage. More particularly, this disclosure relates to methods and systems for efficient content transfer to data stores.

BACKGROUND

In some distributed data storage systems, a client interface, such as an application programming interface (API), is used to provide an interface through which a client application may interact with a server to store content to the distributed data store. The client interface may transfer content to the server in a sequential manner. Such an approach has several drawbacks. Sequential transfer can be slow, particularly when the content being uploaded is large, say larger than 1 GB. As another shortcoming, the client interface may be required to resend the entire content again if any exception occurs. Moreover, if the client application updates the content, the client interface may be required to transfer the entire content (e.g., an entire file) to the server even if only a small portion of the content has changed, leading to transfer of duplicate content.

SUMMARY

Attention is thus directed to the efficient content transfer systems and methods disclosed herein.

One embodiment includes a computer program product comprising a non-transitory computer readable medium, the computer readable medium having stored therein a set of computer readable instructions, including instructions for: receiving a request to store first content to a distributed data store; determining a size of the first content determining a chunk size; determining a first plurality of content chunks to create based on the size of the first content and the chunk size and creating the first plurality of content chunks from the first content; assigning each content chunk in the first plurality of content chunks a chunk id that is unique to that content chunk in the first plurality of content chunks; and communicating with a server to store the first content as an object in the distributed data store, the object comprising object metadata and associated content.

Another embodiment includes a method comprising receiving, from a client application, a request to store first content to a distributed data store; determining a size of the first content; determining a chunk size; determining a first plurality of content chunks to create based on the size of the first content and the chunk size and creating the first plurality of content chunks from the first content; assigning each content chunk in the first plurality of content chunks a chunk id that is unique to that content chunk in the first plurality of content chunks; and communicating with a server to store the first content as an object in the distributed data store, the object comprising object metadata and associated content.

Yet another embodiment includes a system for storing data comprising a distributed data store, a client computer comprising a client application, and a content management computer system coupled to the distributed data store. The content management computer system comprises a server and a client interface. The client interface comprises instructions for receiving a request from the client application to store first content to the distributed data store; determining a size of the first content; determining a chunk size; determining a first plurality of content chunks to create based on the size of the first content and the chunk size and creating the first plurality of content chunks from the first content; assigning each content chunk in the first plurality of content chunks a chunk id that is unique to that content chunk in the first plurality of content chunks; and communicating with the server to store the first content as an object in the distributed data store, the object comprising object metadata and associated content.

According to one embodiment, communicating with the server to store the first content comprises establishing a first plurality of content transfer sessions with the server to transfer the first plurality of content chunks to the server for storage in the distributed data store as the associated content of the object, including establishing at least two parallel content transfer sessions to transfer at least two of the content chunks from the first plurality of content chunks to the server in parallel; and transferring each content chunk from the first plurality of content chunks and chunk metadata for that content chunk to the server using a corresponding content transfer sessions from the first plurality of content transfer sessions, the chunk metadata including the chunk id for that chunk and an indication of the object to which the chunk is to be stored.

According one embodiment, assigning each content chunk in the first plurality of chunks the chunk id that is unique to that content chunk comprises assigning each content chunk in the first plurality of content chunks an index value such that the first plurality of content chunks are associated with a set of consecutive index values.

One embodiment further comprises: receiving, from the server, a second set of index values indicating content chunks from the first plurality of content chunks successfully stored as part of the object; based on identifying an index value included in set of consecutive index values but not in the second set of index values, determining a missing content chunk that was not successfully stored to the object; and establishing a content transfer session with the server for transferring the missing content chunk to the server and transferring the missing content chunk to the server.

One embodiment further comprises: prior to establishing the first plurality of content transfer sessions, establishing a transfer initiation session associated with transferring the first content to the server; signaling the server, via the transfer initiation session, to create the object; and receiving from the server, via the transfer initiation session, an attribute of the object, wherein the indication of the object in the chunk metadata of each content chunk includes the attribute of the object. According to one embodiment, the attribute of the object includes an object id or a data ticket that maps to a directory location for storing the associated content of the object.

According to one embodiment, the server is adapted to store a first set of hash values in the object metadata, the first set of hash values including a hash value for each content chunk in the first plurality of content chunks.

One embodiment further comprises: receiving a request to access the object; establishing a metadata transfer session with the server to transfer the object metadata from the server and receiving the object metadata from the server, the object metadata including a first set of hash values, the first set of hash values including a hash value generated from each content chunk in the first plurality of content chunks, each hash value in the first set of hash values having an associated hash value index value; receiving a request to store second content to the object; creating, from the second content, a first content chunk of the chunk size, assigning the first content chunk a first index value and generating a current hash from the first content chunk; selecting a first hash value from the first set of hash values based on the hash value index value associated with the first hash value matching the first content chunk index value; comparing the first hash value to the current hash value generated from the first content chunk; based on a determination that the first hash value and the current hash value do not match, transferring the first content chunk to the server to store the first content chunk in the object; based on a determination that the first hash value and the current hash value match, skipping the first content chunk.

One embodiment further comprises receiving a request to access the object; establishing a metadata transfer session with the server to transfer the object metadata from the server and receiving the object metadata from the server, the object metadata including a first set of hash values, the first set of hash values including a hash value for each content chunk in the first plurality of content chunks; receiving a request to store second content to the object, the second content being a modified version of the first content; creating a second plurality of content chunks from the second content; generating a second set of hash values, the second set of hash values including a hash value for each content chunk in the second plurality of content chunks; determining which content chunks in the second set of content chunks are unmodified content chunks based on comparing the first set of hash values to the second set of hash values; communicating with a server to store the second content to the object, the communicating with the server to store second content to the object comprising establishing at least one session to transfer the content chunks from the second plurality of content chunks, other than the unmodified content chunks, to the server.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. It may be desirable to upload large files to or download large files from distributed data stores. However, uploads and downloads of large files to distributed data stores is often relatively slow. What is desired, therefore, are systems that can more quickly upload objects to or download objects from distributed data stores or other data stores. What is also desired are mechanisms to reduce or obviate transferring duplicate content to a data store.

To those ends, among others, attention is now directed to the systems and methods of efficient content transfer disclosed herein. More particularly, some embodiments provide systems and methods of efficient content transfer to a server using parallel sessions. In addition, or in the alternative, some embodiments provide systems and methods of efficient content transfer from a server using parallel sessions. Some embodiments provide systems and methods for limiting the number of chunks uploaded when content is modified. These and other aspects of efficient content transfer may be better understood with reference to non-limiting embodiments described in conjunction with the figures.

Figure 1:
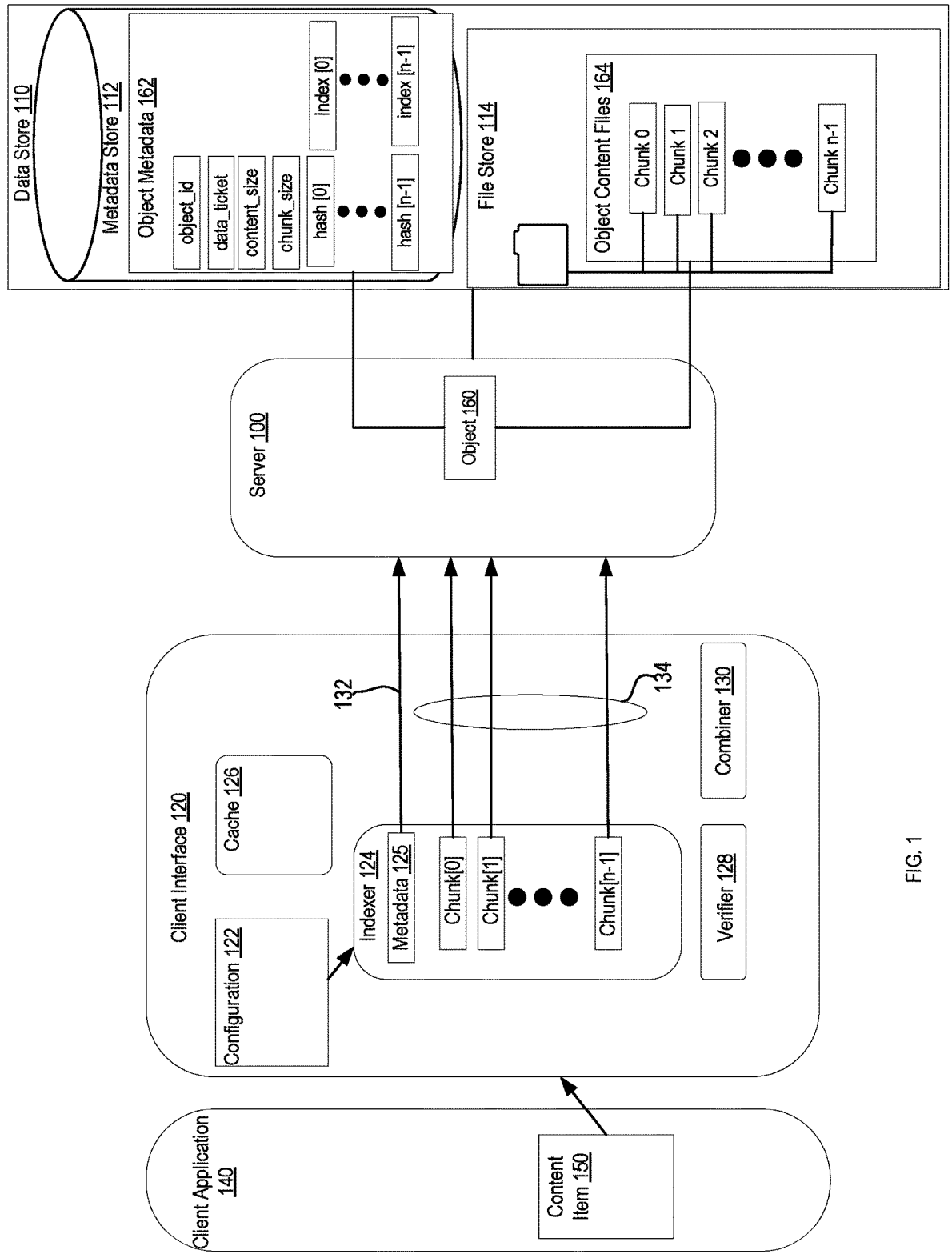
FIG. 1 is a diagrammatic representation of one embodiment a system for content transfer and storage in which content is being transferred to a server.

FIG. 1 is a diagrammatic representation of one embodiment of a system for content transfer and storage that includes a server 100, a data store 110, a client interface 120 and a client application 140.

Data store 110, which can include one or more databases, filesystems or other types of data stores or combinations thereof, is a network accessible data store that provides an interface, such as a public Application Program Interface (API) or other interface, for transferring content to and/or downloading content from a data store 110. By way of example, but not limitation, data store 110 may be a distributed data store comprising a computer network where information is stored on multiple nodes or clusters. In some embodiments, data store 110 comprises a cloud storage system in which digital data is stored in logical pools on physical media that can span multiple servers. The interface provided by data store 110 may support multi-part upload in which an object can uploaded as a set of independently uploaded chunks and/or multi-part download in which an object can be downloaded as a set of independently downloaded chunks.

Server 100 manages, protects and imposes structure on content in data store 110. According to one embodiment, server 100 is object-oriented. Each item of managed content is stored as a content object. As will be appreciated, server 100 may support a wide variety of content object types. A content object includes associated content and associated content object metadata. The associated content is stored as a content file. Content files associated with the content objects are stored in a file system, in a database (e.g., as blobs in a relational database or non-relational database), or as sets of logically related data that are managed as a file. The content object metadata for each content object is stored as a record in a database (e.g., a relational or non-relational database) and includes a reference to the associated content file. To this end then, data store 110 includes a metadata store 112 for storing object metadata and a file store 114 for storing associated content files.

According to one embodiment, content object metadata is contained in properties. Properties are the fields that comprise an object definition. The values in those fields describe individual instances of the object type—that is, the values for the properties describe individual content objects. When an object is created, its properties are set to values that describe that particular instance of the object type. For example, if two properties of a content object type are "title" and "subject" then each content object of that type will have title and subject properties containing respective values for the associated content files of those objects.

According to one embodiment, properties are either a single-valued type or repeating type. A property of the single-valued type (a "single-valued property") stores one value or, if it stores multiple values, stores them in one list (e.g., a comma separated list). Querying a single-valued property returns the entire value, whether it is one value or a list of values. The tables that store the values for single-valued properties are referred to as "_s tables" herein. A property of the repeating type (a "repeating property") stores multiple values in an indexed list. Index positions within the list can be specified when referencing a specific value in a repeating property. As an example, say a media content object type has the repeating properties "keywords" and "presenters," then the index position within the list of a repeating property for a particular media content object of that type (a particular instance of the media content object type) can be specified in brackets at the end of the property name ("keywords[2]" or "presenters[17]"). Full-text queries can also locate specific values.

In one embodiment, each persistent object type is represented by a corresponding single-valued table (referred to as an "_s table" herein) and repeating value table (referred to as an "_r table" herein). In the _s tables, each column represents one property and each row represents one instance of the object type. The tables that store the values for single-valued properties are identified by the object type name. The column values in the row represent the single-valued property values for that object. In the _r tables, each column represents one property and there is a separate row for each value in a repeating property. Each row includes an object_id to identify the object that contains the repeating property values. If an object type has two or more repeating properties, the number of rows in the _r table for each object of that type is equal to the number of values in the repeating property that has the most values. The columns for repeating properties having fewer values are filled with NULLS in rows below the last value for that repeating property.

Turning to other entities in FIG. 1, client application 140 provides an interface between server 100 and end-users. For example, client application 140 may be implemented on an end-user's terminal (e.g., as a heavy application) to provide an interface to server 100. In another embodiment, client application 140 runs on an application server, and end users use an end-user application, such as browser, to access client application 140. In some embodiments, client application 140 runs on the same machine as server 100. In other embodiments, client application 140 and server 100 run on different machines. There may be many client applications that utilize server 100.

Client interface 120 lies between server 100 and client applications and provides a client interface to server 100. Client interface 120 is an interface through which client application 140 can interact with server 100 to store content, access content or perform other operations with respect to content. More particularly, client interface 120 establishes sessions with server 100 to transfer content to/from server 100. A session maintains a connection to server 100 and can give access to content objects managed by server 100. For example, a session can provides access to managed objects for a specific logical user whose credentials are authenticated before establishing the connection maintained by the session. According to one embodiment, client interface 120 is implemented as an API and, according to an even more particular embodiment, an API that comprises a set of Java classes that provide access to features of server 100.

In the embodiment illustrated, client interface 120 includes a configuration 122, indexer 124, cache 126, verifier 128 and combiner 130. Configuration 122 includes configuration information to control parallel content transfer. In a particular embodiment, configuration 122 includes a chunk size (e.g., maximum memory size of individual chunks of content to be uploaded), and a maximum number of sessions. Preferably, the maximum number of sessions is at least two so that at least two content chunks are transferred to server 100 in parallel. Indexer 124 is configured to break content up into chunks and transfer the content to server 100 using parallel sessions. Verifier 128 verifies the number of chunks transferred based, for example, on content size and can resend missing chunks to server 100. Combiner 130 is configured to retrieve chunks.

Client interface 120 provides functionality to allow client applications to import content items, such as files, into data store 110. For example, client interface 120 can provide functionality to allow client application 140 can import content item 150 into data store 110 using client interface 120. Based on a request to import content item 150 into data store 110, indexer 124 accesses configuration 122 to determine the chunk size and the maximum number of sessions to use for the content transfer. Indexer 124 further determines the size of content item 150 to be transferred (e.g., file size). Based on the chunk size and size of the content item to be transferred, indexer 124 determines the number n of content chunks required to transfer content item 150 to server 100, creates the n content chunks and assigns each content chunk a chunk id, such as an index value, that is unique to that content chunk in the set of n content chunks created from content item 150. For example, if content item 150 is a 1025 MB file and the configured chunk size is 1 MB, indexer 124 may split content item 150 into 1025 content chunks and index the content chunks 0-1024.

Indexer 124 establishes a first session 132 to initiate importing content item 150 to server 100 and to transfer metadata for content item 150. Metadata 125 can include metadata provided or determined for the content being imported. In particular, metadata 125 may include the size of content item 150 to be imported (e.g., the size of the file), the chunk size and the number of chunks. Metadata 125 may also include other metadata provided or determined for content item 150, such as a name, author or any other metadata.

Server 100 creates a content object 160 representing content item 150 and stores associated object metadata 162 for the object. While illustrated as a single object, content object 160 may comprise multiple objects according to an object model. As part of creating content object 160, server 100 assigns a unique object id to the content object, for example, such that the content of content item 150 can be located using the object id. Thus, the associated object metadata 162 of content object 160 can include the object id generated for the object and metadata 125 transferred via client interface 120 for content item 150 to be managed using content object 160.

Server 100 further determines a location in file store 114 at which the content of content item 150 will be stored and adds a data ticket to object metadata 162 of content object 160, where the data ticket acts as a pointer to the location in file store 114. In one embodiment, the data ticket maps to a file path. By way example, but not limitation, the mapping the data ticket to a file path may involve converting the data ticket to a 2's compliment hexadecimal number and converting the 2's compliment hexadecimal number to the file path. For example, if the data ticket is −2147440397, the 2's complement hexadecimal number is FFFFFFFF8000A8F3. The data ticket can be further converted by adding one and splitting the last eight digits every two digits to determine 80/00/A8/F4. In this example, if the base path for storing content in file store 114 is c:/Documentum/data/docbase/content_storage_01, then the content associated with the data ticket is −2147440397 may be stored at the relative path c:/Documentum/data/docbase/content_storage_01/80/00/A8/F4. The foregoing example of mapping a data ticket to a directory location is provided by way of example and not limitation. The data ticket may include any suitable pointer, including, but not limited to, a full path or relative path name to a directory location.

Server 100 returns attributes of content object 160 to client interface 120, such as the object id, a data ticket, or other attributes using the session 132. Client interface 120 stores the metadata in cache 126 for use in other sessions.

Indexer 124 establishes parallel content transfer sessions 134 up to the maximum number of sessions specified by configuration 122 to transfer the n content chunks of content item 150. For example, if the maximum number of sessions specified is ten (10), and the number of content chunks to be transferred is more than ten, indexer 124 launches ten parallel content transfer sessions to transfer ten content chunks of content item 150 in parallel. Once transfer of a content chunk is completed using a session 134, the session 134 can be used to transfer another content chunk of content item 150. In another embodiment, a new session is launched to transfer the next non-transferred content chunk. In other embodiments, the number of sessions is not limited by configuration 122 and indexer 124 launches a content transfer session 134 for each of the n content chunks to be transferred. Using the example of a 1025 MB file and a 1 MB chunk size, indexer 124 can launch 1025 sessions 134 to transfer the 1025 chunks in parallel.

Each content transfer session 134 transfers a content chunk and respective chunk metadata. The respective chunk metadata of each content chunk includes the chunk id for that chunk and an indication of the content object to which the chunk is to be stored. For example, the chunk metadata for a chunk may include an index value (or other chunk id) and the object id returned by server 100 (or other indication of the object) for importing content item 150. The chunk metadata may also include other information, such as the size of the chunk.

For each content chunk received, server 100 receives the chunk id for that chunk and an indication of the content object to which the chunk is to be stored. Thus, the chunk ids (illustrated as the index values in FIG. 1) and other chunk metadata may be stored in object metadata 162 of content object 160. In one embodiment, the chunk ids are stored in a repeating property of content object 160 (e.g., index_value[0]:0; index_value[1]:1). Using the object id, server 100 accesses the data ticket and stores the content chunk at the appropriate location in file store 114. According to one embodiment, each content chunk of content item 150 is stored as a separate file, with the content chunks of content item 150 being stored in a logically related fashion, such as in a directory established for storing the content of content item 150. Thus, content object 160 can include associated object content files 164 storing the content of content item 150.

The combination data ticket and chunk id give the relative path of a content chunk. For example, the filename under which a chunk is stored may be based on the chunk id. As a more particular example, assume content item 150 is a text file and server 100 has determined that the content of content item 150 is to be stored at the relative path location 01/80/00/A8/F4, then a chunk of content item 150 with chunk id '0' may be stored as 01/80/00/A8/F4/0.txt, a chunk of content item 150 with chunk id '1' may be stored as 01/80/00/A8/F4/1.txt and so on. In this example, the starting chunk of content item 150 may be located in file store 114 using the data ticket to identify the directory 01/80/00/A8/F4 and chunk id 'O' to identify the file 0.txt within that directory.

Server 100 hashes each content chunk of content item 150 and stores the respective hash values in object metadata 162. The hash values may be generated using MD5, SHA-1, SHA-2, NTLM, LANMAN or other hash algorithm. Each hash value may have an associated hash value index value that corresponds to an index value of a content chunk from which the hash value was generated. The hash values are stored in a repeating attribute of content object 160 (e.g., hash[0]: hash_value0; hash[1]:hash_value1; hash[2]: hash_value2).

When the content transfer sessions have completed transferring the content chunks or at the occurrence of some other predetermined event, verifier 128 sends a request to server 100 for the chunk ids (e.g., index values) of chunks stored to content object 160. If any content chunks are missing, indexer 124 can launch sessions to upload the missing chunks based on missing chunk ids.

It will be appreciated that embodiments described herein may be implemented in a variety of systems. In some embodiments, a content transfer system may content items smaller than a threshold size using non-chunked content transfer and use parallel content transfer for content items that meet the threshold size.

Figure 2A:
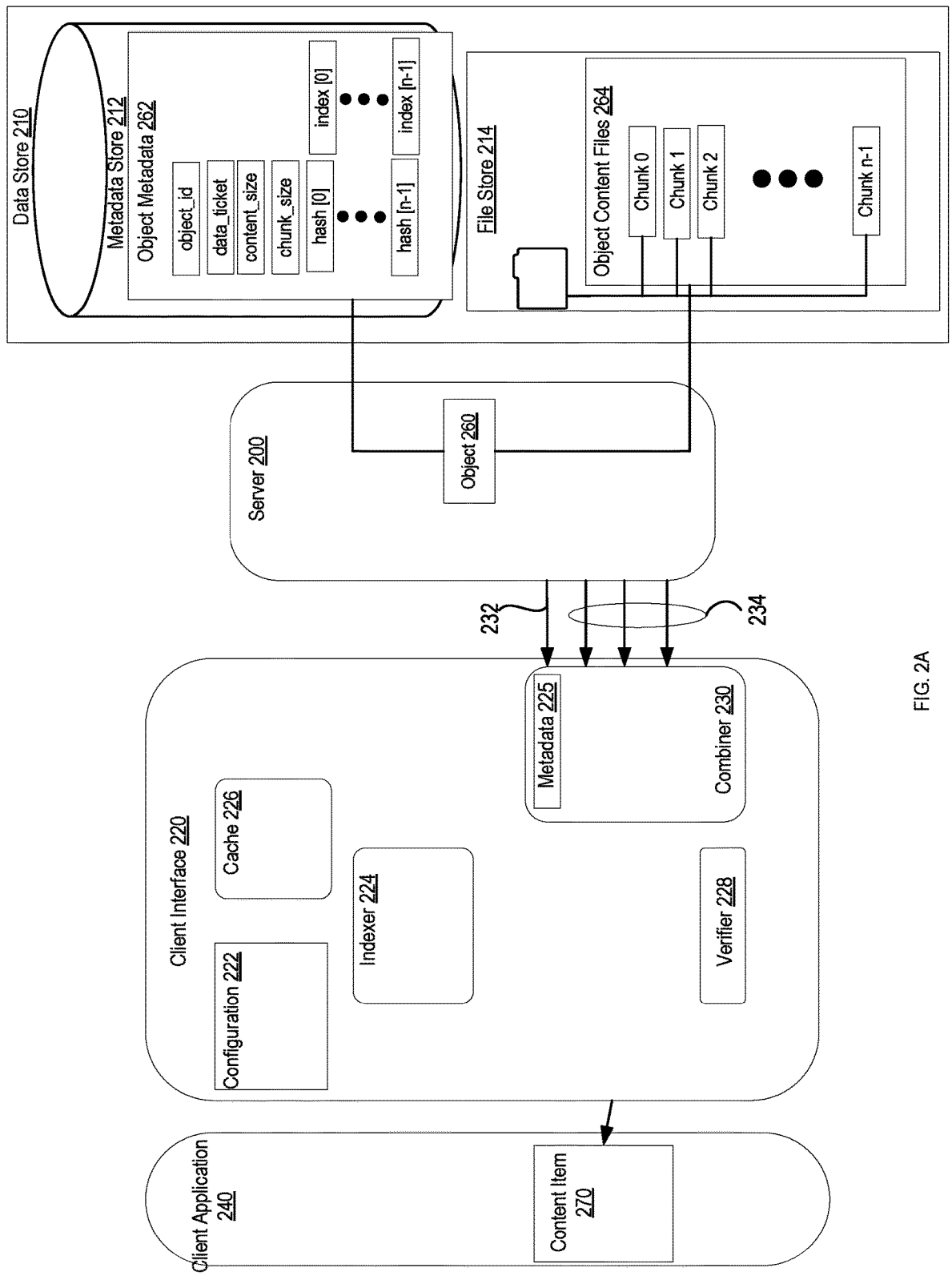
FIG. 2A is a diagrammatic representation of one embodiment of a system for content transfer and storage in which content is being transferred from a server.
Figure 2B:
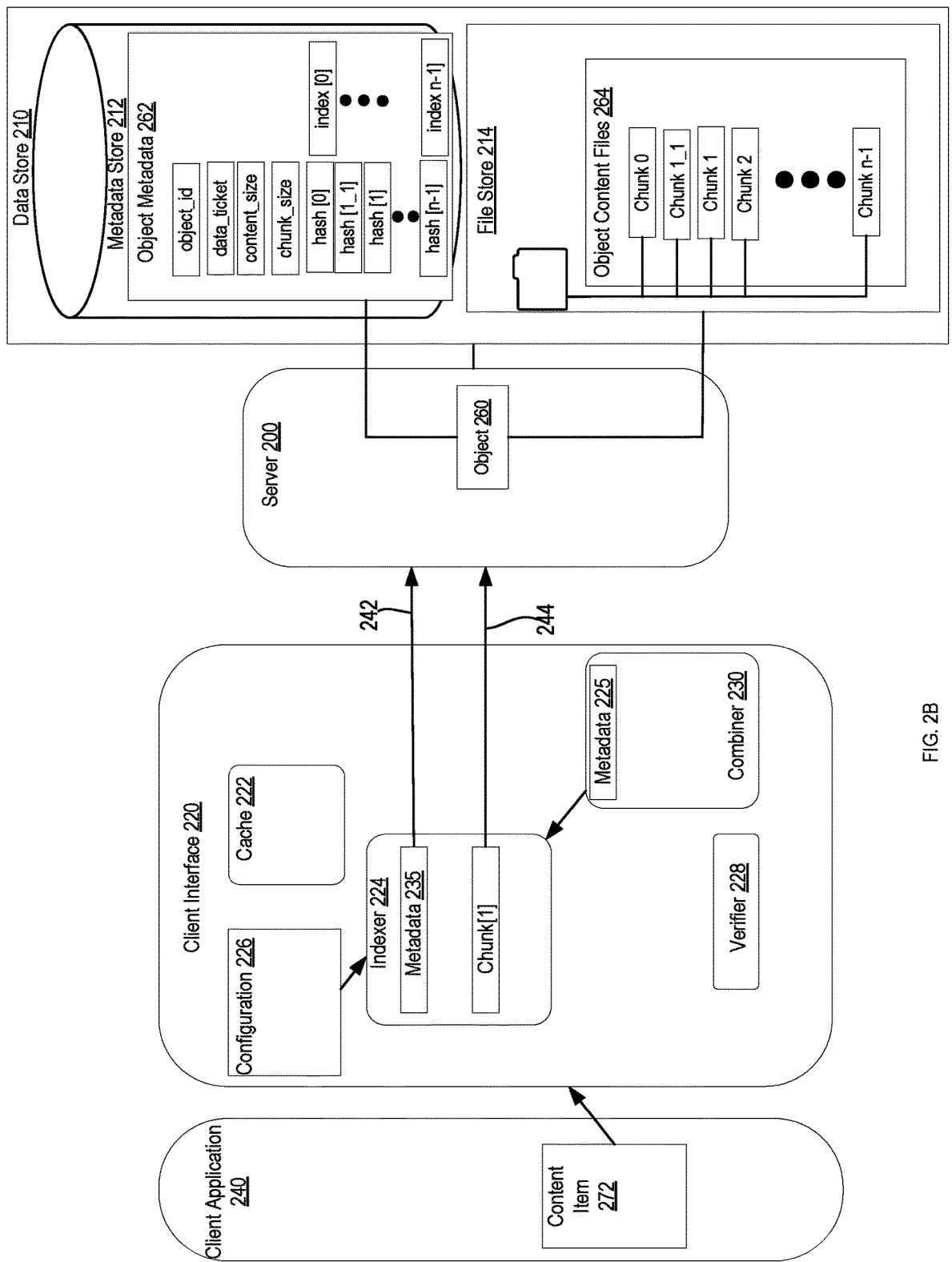
FIG. 2B is a flow chart illustrating one embodiment a system for content transfer and storage in which modified content is being transferred to the server.

FIG. 2A and FIG. 2B illustrate of one embodiment of a system for content transfer and storage that includes a server 200, a data store 210, a client interface 220 and a client application 240. More particularly, FIG. 2A illustrates an embodiment of the system transferring content from data store 210 to client application 240 and FIG. 2B illustrates one embodiment of the system transferring updated content from client application 240 to data store 210. In one embodiment, client interface 120 and client interface 220 may be implemented as part of the same interface.

Data store 210, which can include one or more databases, filesystems or other types of data stores or combinations thereof, is a network accessible data store that provides an interface, such as a public Application Program Interface (API) or other interface, for transferring content from data store 210. By way of example, but not limitation, data store 210 may be a distributed data store comprising a computer network where information is stored on multiple nodes or clusters. In some embodiments, data store 210 comprises a cloud storage system in which digital data is stored in logical pools on physical media that can span multiple servers. The interface provided by data store 210 may support multi-part upload in which an object can uploaded as a set of independently uploaded chunks and/or multi-part download in which an object can be downloaded as a set of independently downloaded chunks.

Server 200 manages, protects and imposes structure on content in data store 210. According to one embodiment, server 200 is object-oriented. Each item of managed content is stored as a content object. As will be appreciated, server 200 may support a wide variety of content object types. A content object includes associated content and associated content object metadata. The associated content is stored as a content file. Content files associated with the content objects are stored in a file system, in a database (e.g., as blobs in a relational database or non-relational database), or as sets of logically related data that are managed as a file. The content object metadata for each content object is stored as a record in a database (e.g., a relational or non-relational database) and includes a reference to the associated content file. To this end then, data store 210 includes a metadata store 212 for storing object metadata and a file store 214 for storing associated content files.

According to one embodiment, content object metadata is contained in properties. Properties are the fields that comprise an object definition. The values in those fields describe individual instances of the object type—that is, the values for the properties describe individual content objects. When an object is created, its properties are set to values that describe that particular instance of the object type. For example, if two properties of a content object type are "title" and "subject" then each content object of that type will have title and subject properties containing respective values for the associated content files of those objects. According to one embodiment, properties are either a single-valued type or repeating type. In one embodiment, each persistent object type is represented by a corresponding _s table_r table Turning to other entities in FIG. 2A, client application 240 provides an interface between server 200 and end-users. For example, client application 240 may be implemented on an end-user's terminal (e.g., as a heavy application) to provide an interface to server 200. In another embodiment, client application 240 runs on an application server, and end users use an end-user application, such as browser, to access client application 240. In some embodiments, client application 240 runs on the same machine as server 200. In other embodiments, client application 240 and server 200 run on different machines. There may be many client applications that utilize server 200.

Client interface 220 lies between server 200 and client applications and provides a client interface to server 200. Client interface 220 is an interface through which client application 240 can interact with content server 200 to store content, access content or perform other operations with respect to content. More particularly, client interface 220 establishes sessions with server 200 to transfer content to/from server 200. A session maintains a connection to server 200 and can give access to objects managed by server 200. For example, a session can provides access to managed objects for a specific logical user whose credentials are authenticated before establishing the connection maintained by the session. According to one embodiment, client interface 220 is implemented as an API and, according to an even more particular embodiment, an API that comprises a set of Java classes that provide access to features of server 200.

In the embodiment illustrated, client interface 220 includes a configuration 222, indexer 224, cache 226, verifier 228 and combiner 230. Configuration 222 includes configuration information to control parallel content transfer. In a particular embodiment, configuration 222 includes a chunk size (e.g., maximum memory size of individual chunks of content to be uploaded), and a maximum number of sessions. Preferably, the maximum number of sessions is at least two so that at least two content chunks are transferred to server 200 in parallel. Indexer 224 is configured to break content up into chunks and transfer the content to server 200 using parallel sessions. Verifier 228 verifies the number of chunks transferred based, for example, on content size and can resend missing chunks to server 200. Combiner 230 is configured to retrieve chunks.

Client interface 220 provides functionality to allow client programs to retrieve content items, such as files, into data store 210. For example, client interface 220 can provide functionality to allow client application 240 to retrieve a content item 270 from data store 210 using client interface 220. In the embodiment illustrated, content item 270 is stored in data store 210 as a content object 260 that includes associated object metadata 262 and associated content chunks. According to one embodiment, each content chunk of content item 270 is stored as a separate file, with the content chunks of content item 270 being stored in a logically related fashion, such as in a directory established for storing the content of content item 270. Thus, content object 260 can include associated object content files 264 storing the content of content item 270. The metadata 262 of content object 260 includes a data ticket, where the data ticket acts as a pointer to the location in file store 214.

Based on a request to retrieve a content item 270 from data store 210 (e.g., a request to retrieve content object 260), combiner 230 accesses configuration 222 to determine the maximum number of sessions to use for the data transfer. Combiner 230 establishes a first session 232 to initiate retrieval of content from server 200 and to transfer metadata. In particular, combiner 230 provides the object id for content object 260 via session 232 and server 200 returns metadata 225. In particular, metadata 225 may include the size of content item 270 to be retrieved (e.g., the size of the file), the number of content chunks, the chunk ids (index values), the hash value associated with each content chunk, a data ticket or other metadata provided or determined for content item 270, such as a name, author or any other metadata. Metadata 225 may be cached in cache 226 for later use.

Combiner 230 establishes parallel content transfer sessions 234 up to the maximum number of sessions specified by configuration 222 to transfer the n content chunks of content item 270. For example, if the maximum number of sessions specified is ten (10), and the number of content chunks to be transferred is more than ten, combiner 230 launches ten parallel content transfer sessions to transfer ten content chunks of content item 270 in parallel. Once transfer of a content chunk is completed using a session 234, the session 234 can be used to transfer another content chunk of content item 270. In another embodiment, a new session is launched to transfer the next non-transferred content chunk. In other embodiments, the number of sessions is not limited by configuration 222 and combiner launches a content transfer session 234 for each of the n content chunks to be transferred. Using the example of a 1025 MB file and a 1 MB chunk size, combiner 230 can launch 1025 sessions 234 to transfer the 1025 chunks in parallel.

Each content transfer session 234 transfers a respective content chunk. According to one embodiment, combiner 230 provides in each session 234 an indication of the object from which the chunk is to be retrieved and the chunk id to be retrieved. For example, combiner 230 provides the content object's object id (or other indication of the object) and index value (or other chunk id) of the chunk to be transferred using a content transfer session 234 and the content transfer session 234 transfers the respective content chunk. As discussed above in conjunction with FIG. 1, server 200 can use a data ticket associated with the object id and chunk id to locate the respective chunk in file store 214 for transfer.

When the content transfer sessions have completed transferring the content chunks or at the occurrence of some other predetermined event, combiner 230 determines if all the content chunks have been received. If any content chunks are missing, combiner 230 can launch sessions to retrieve the missing chunks based on chunk ids for which chunks are missing.

In some embodiments, combiner 230 combines the downloaded content chunks into content item 270 and provides the complete content item 270 to client application 240 once combined. For example, combiner 230 may combine n.txt files (or other files) into a single .txt file (or other file format) and provide content item 270 to client application as the combined text file. In other embodiments, combiner 230 provides content chunks to client application 240 on a chunk-by-chunk basis. For example, client application 240 may be configured to view content on a page wise basis and combiner 230 can begin providing the content of content item 270 to client application 240 as soon as the first chunk is retrieved, while a background number of sessions retrieve the rest of the content chunks. For example, combiner 230 may stream a first content chunk file to client application when the first content chunk file is received from server 200, while sessions retrieve the other content chunk files of content item 270. Here, the wait time experienced by client application 240 between requesting a content item and receiving responsive content is primarily based on the first content chunk retrieving time.

Turning to FIG. 2B, client application 240 may request to update a content item (e.g., update a file) stored in data store 210. For example, client application 240 may request to update content object 260 with updated content item 272, which is an updated version of content item 270. Based on a request to update an existing content item (e.g., update existing content object 260 with an updated content item 272), indexer 224 accesses configuration 222 to determine the chunk size and the maximum number of sessions to use for the content transfer. Indexer 224 further determines the size of the updated content item 272 to be transferred (e.g., file size). Based on the chunk size and size of the content item to be transferred, indexer 224 determines the number m of content chunks for content item 272 to server 100, creates the m content chunks and assigns each content chunk a chunk id, such as an index value, that is unique to that content chunk in the set of m content chunks created from content item 272. For example, if content item 272 is a 1025 MB file and the configured chunk size is 1 MB, indexer 224 may split content item 272 into 1025 content chunks and index the content chunks 0-1024.

For each content chunk, indexer 224 hashes the content chunk (e.g., using the same hashing algorithm as server 200) to determine a current hash for each content chunk. For example, assuming indexer creates m content chunks from content item 272 to store as content object 260, indexer 224 can create current_hash_value0 for the chunk corresponding to index value 0, current_hash_value1 for a chunk corresponding to index value 1 and so on to current_hash_value (m−1). Indexer 224 further retrieves a prior hash value for each content chunk. For example, indexer 224 accesses metadata 225 received from server 100 to determine the prior hash values calculated by the server for each chunk 0-n associated with content object 260 (e.g., hash_value0 associated with index value 0, hash_value1 associated with index value 1 and so on to hash_value(n−1)) and compares the prior hash value to the current hash value. If the hash values for a content chunk match, indexer 224 determines that the chunk has not been updated. If the hash values for a content chunk do not match, indexer 224 determines that the content chunk has been updated. For example, if hash_value0 retrieved from server 200 for content object 260 and current_hash_value0 determined for updated content item 272 to be stored as content object 260 match this indicates that updated content item 272 does not update chunk 0 of content item 270, whereas if hash_value1 retrieved from server 200 for content object 260 and current_hash_value1 determined for updated content item 272 to be stored as content object 260 do not match, this indicates that chunk 1 of content item 270 has been changed in updated content item 272. If the number of chunks previously associated with content object 260 (e.g., the number of chunks of content item 270) differs from the number of content chunks determined for updated content item 270, indexer 224 can also determine which chunks were removed or added.

Indexer 224 establishes a first session 242 to initiate updating content object 260 and to transfer metadata 235. Metadata 235 can include metadata provided or determined for the content being update. In particular, metadata 235 may include the size of the updated content item 272 (e.g., the size of the file), the chunk size and the number of chunks. Metadata 235 may also include other metadata provided or determined for content item 272, such as a name, author or any other metadata. In some embodiments, indexer 224 can include a list of content chunks to be removed (e.g., if updated content item 272 is smaller than the prior version content item 270).

Indexer 224 establishes a content transfer session 244 up to the maximum number of sessions specified by configuration 222 to transfer the updated content chunks (e.g., changed or added chunks). For example, if the maximum number of sessions specified is ten (10), and the number updated and added content chunks to be transferred is more than ten, indexer 224 launches ten parallel content transfer sessions to transfer ten content chunks of content item 272 in parallel. Once transfer of a content chunk is completed using a session 244, the session 244 can be used to transfer another content chunk of content item 272. In another embodiment, a new session is launched to transfer the next non-transferred updated content chunk. In other embodiments, the number of sessions is not limited by configuration 222 and indexer 224 launches a content transfer session 244 for each of the updated content chunks to be transferred. It can be noted then that client interface 220 does have to transfer duplicate content to server 200 for chunks that were not changed by an update.

Each content transfer session 244 transfers an updated content chunk and respective chunk metadata. The respective chunk metadata of each content chunk includes the chunk id for that chunk and an indication of the content object to which the chunk is to be stored. For example, the chunk metadata for a chunk may include an index value (or other chunk id) and the object id (or other indication of the object) for the content object to be updated. The chunk metadata may also include other information, such as the size of the chunk. In some embodiments, the chunk id or other content chunk metadata indicates that a content chunk is an updated content chunk. For example, if it is determined that content chunk 1 of content item 272 is an updated content chunk (e.g., the hash_value1 retrieved from content object 260 does not match current_hash_value1 for the chunk to be stored using content object 260), then the chunk id for chunk 1 may be updated to 1_1 or other indication that the chunk being transferred is an update of an existing chunk. In another embodiment, the chunk metadata includes the index value for the chunk and the server determines that the chunk is an updated chunk based on content object 260 already having a chunk for that index value. For example, if server 200 receives an update request associated with content object 260 and a content chunk with the index value "1", server 200 can determine that that the received content chunk is an updated version of content chunk 1. Similarly, server 200 can determine added content chunks.

For each content chunk received, server 200 receives the chunk id for that chunk and an indication of the content object to which the chunk is to be stored. Thus, the chunk ids (illustrated as the index values in FIG. 2B) and other chunk metadata may be stored in object metadata 262 of content object 260. In one embodiment, the chunk ids are stored in a repeating property of content object 260 (e.g., index_value [0]:0 index_value[1]:1_1, 1). Using the object id, server 200 accesses the data ticket and stores the content chunk at the appropriate location in file store 214. For example, the updated content chunk 1 may be stored as 1_1.txt at the appropriate directory location. The prior version of a content chunk may be retained so that prior versions of a content object can be accessed as needed. For example, file 1.txt is retained in the example of FIG. 2B. The current_hash_value determined for each chunk transferred may be transferred in the chunk metadata or server 200 may calculate the hash value. In any case, the hash_value for each content chunk associated with content object 260 can be stored in the object metadata 262 of content object 260.

It will be appreciated that embodiments described herein may be implemented in a variety of systems. In some embodiments, a content transfer system may upload/download content smaller than a threshold size using byte-by-byte content stream transfer and use parallel upload or parallel download for content items that meet the threshold size.

Figure 3:
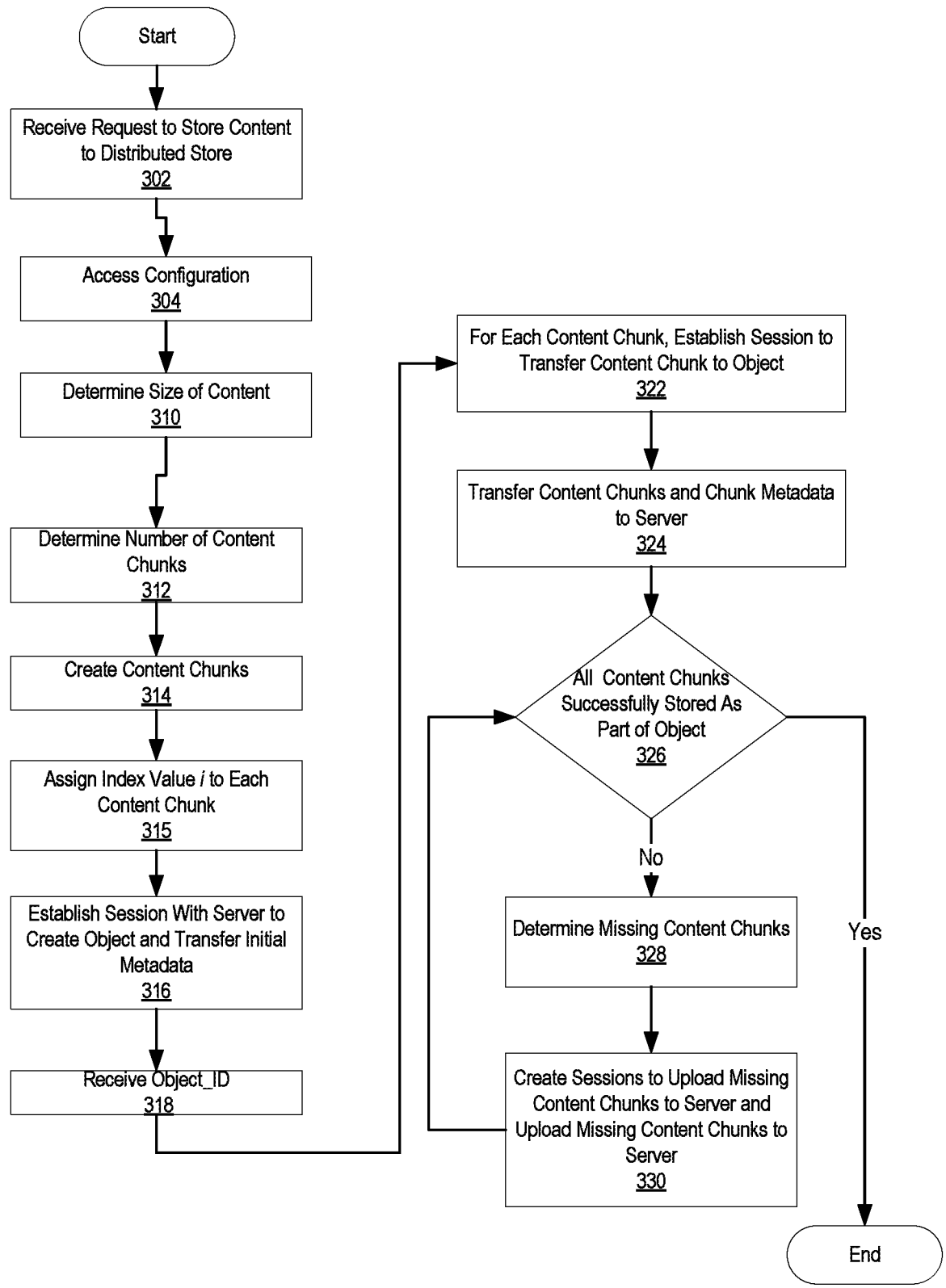
FIG. 3 is a flow chart illustrating one embodiment of a method for transferring content to a server.

FIG. 3 is a flow chart illustrating one embodiment of a method for parallel content transfer to store a content item at a data store. One or more steps of FIG. 3 may be embodied as computer-executable instructions on a non-transitory computer-readable medium. One or more steps of FIG. 3 may be implemented by a content transfer system. By way of example, but not limitation, one or more steps of FIG. 3 may be performed by a client interface, such as client interface 120, 220.

At step 302, a client interface receives a request to store a content item, such as a file, to a data store. The client interface accesses a configuration to determine a chunk size and the maximum number of sessions to use for the content transfer (step 304). The client interface further determines the size of content to be transferred (e.g., file size) (step 310). Based on the chunk size and the size of the content to be transferred, the client interface determines the number of content chunks 'n' to be created from the content to be transferred (step 312) and creates the content chunks (step 314). At step 315, the client interface assigns a chunk id, such as an index value i, to each content chunk created in step 314. The client interface establishes a first session to initiate importing the content item to a server associated with the data store and to transfer metadata for the content item (step 316). The metadata transferred may include, for example, metadata provided or determined for the content item being transferred. In particular, the metadata may include the size of the content item to be transferred (e.g., the size of the file), the chunk size and the number of chunks. The metadata may also include other metadata provided or determined for content item, such as a name, author or any other metadata.

At step 318, the client interface receives an object id for a content object used to manage the content. In particular, the server creates a content object representing the content item and stores associated object metadata for the content object in a metadata store. As part of creating the object, the server assigns a unique object id to the content object and returns the object id to the client interface. The server further determines a location in a file store at which the content associated with the content object will be stored and adds a data ticket to the object metadata of the content object, where the data ticket acts as a pointer to the location in the file store.

The client interface establishes parallel content transfer sessions up to the maximum number of sessions (if any) specified by the configuration to transfer the n content chunks of the content item (step 322). The client interface transfers the content chunks to the server using the parallel sessions (step 324). Once transfer of a content chunk is completed using a session, the session can be used to transfer another content chunk of the content item. In another embodiment, a new session is launched to transfer the next non-transferred content chunk. In other embodiments, the number of sessions is not limited by configuration and the client interfaces launches n content transfer sessions to transfer the n content chunks.

Each content transfer session transfers a content chunk and respective chunk metadata. The respective chunk metadata of each content chunk includes the chunk id for that chunk and an indication of the content object to which the chunk is to be stored. For example, the chunk metadata for a chunk may include an index value i (or another chunk id) and the object id returned by the server. The chunk metadata may also include other information, such as the size of the chunk.

At step 326, the client interface determines if all content chunks of the content item were successfully stored as part of the content object. According to one embodiment, when the content transfer sessions have completed transferring the content chunks or at the occurrence of some other predetermined event, the client interface sends a request to the server for the chunk ids (e.g., index values) of chunks stored to the content object created in step 318. The client interface can determine any missing content chunks based on the response by the server missing chunk ids (step 328). If any content chunks are missing, the client interface can launch sessions to upload the missing chunks based on missing chunk ids (step 330).

FIG. 3 is provided by of example and not limitation. Various steps may be repeated, steps may be performed in different orders, steps omitted, and additional or alternative steps performed.

Figure 4:
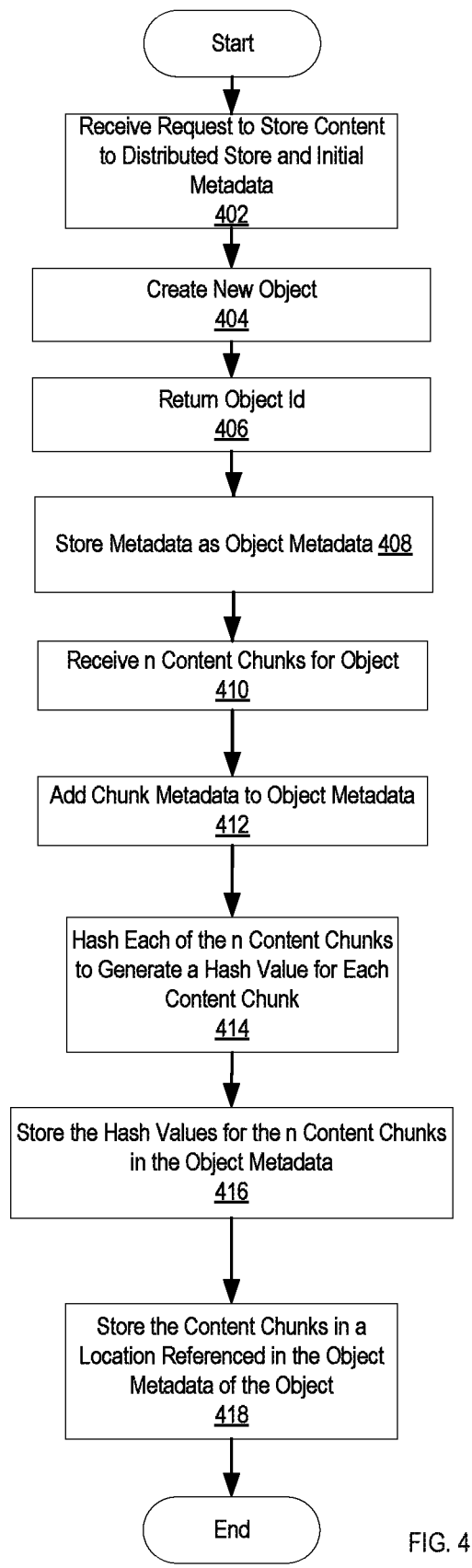
FIG. 4 is a flow chart illustrating one embodiment of a method for tracking content and storing content to a data store.

FIG. 4 is a flow chart illustrating one embodiment of a method for storing content to a data store. One or more steps of FIG. 4 may be embodied as computer-executable instructions on a non-transitory computer-readable medium. One or more steps of FIG. 4 may be implemented by a content transfer system. By way of example, but not limitation, one or more steps of FIG. 4 may be performed by a server, such as server 100, 200.

At step 402, a session is established with the server and the server receives a request to store content to a distributed store. The initial metadata transferred may include, for example, metadata provided or determined for a content item. In particular, the metadata may include the size of the content item to be transferred (e.g., the size of the file), the chunk size and the number of chunks. The metadata may also include other metadata provided or determined for content item, such as a name, author or any other metadata.

At step 404, the server creates a content object representing the content item. As part of creating the object, the server assigns a unique object id to the content object. The server further determines a location in a file store at which the content associated with the object will be stored and adds a data ticket to the object metadata of the content object, where the data ticket acts as a pointer to the location in the file store. The server returns the object id for the object to the client interface (step 406). The server stores metadata for the object, including, for example, the object id, data ticket and metadata received from the client interface, as object metadata in a metadata store (step 408).

At step 410, the server receives n chunks of content using two or more parallel content transfer sessions. Each of the n chunks may be transferred with chunk metadata. The respective chunk metadata of each content chunk includes the chunk id for that chunk and an indication of the content object to which the chunk is to be stored. For example, the chunk metadata for a chunk may include an index value (or another chunk id) and the object id provided in step 406. The chunk metadata may also include other information, such as the size of the chunk. Thus, the server can store the chunk ids and other chunk metadata in object metadata of the indicated content object (step 412).

For each content chunk received, the server hashes each content chunk of the content item (step 414) and stores the respective hash values for each chunk as part of the object metadata of the indicated content object (step 416). Using the object id, the server accesses the data ticket associated with the content object and stores the content chunks at the appropriate location in the file store (step 418). According to one embodiment, each content chunk of transferred content item is stored as a separate file, with the content chunks of the content item being stored in a logically related fashion, such as in a directory established for storing the content of the content item (e.g., in a directory established for storing associated content of the content object indicated by the object id).

FIG. 4 is provided by of example and not limitation. Various steps may be repeated, steps may be performed in different orders, steps omitted, and additional or alternative steps performed.

Figure 5:
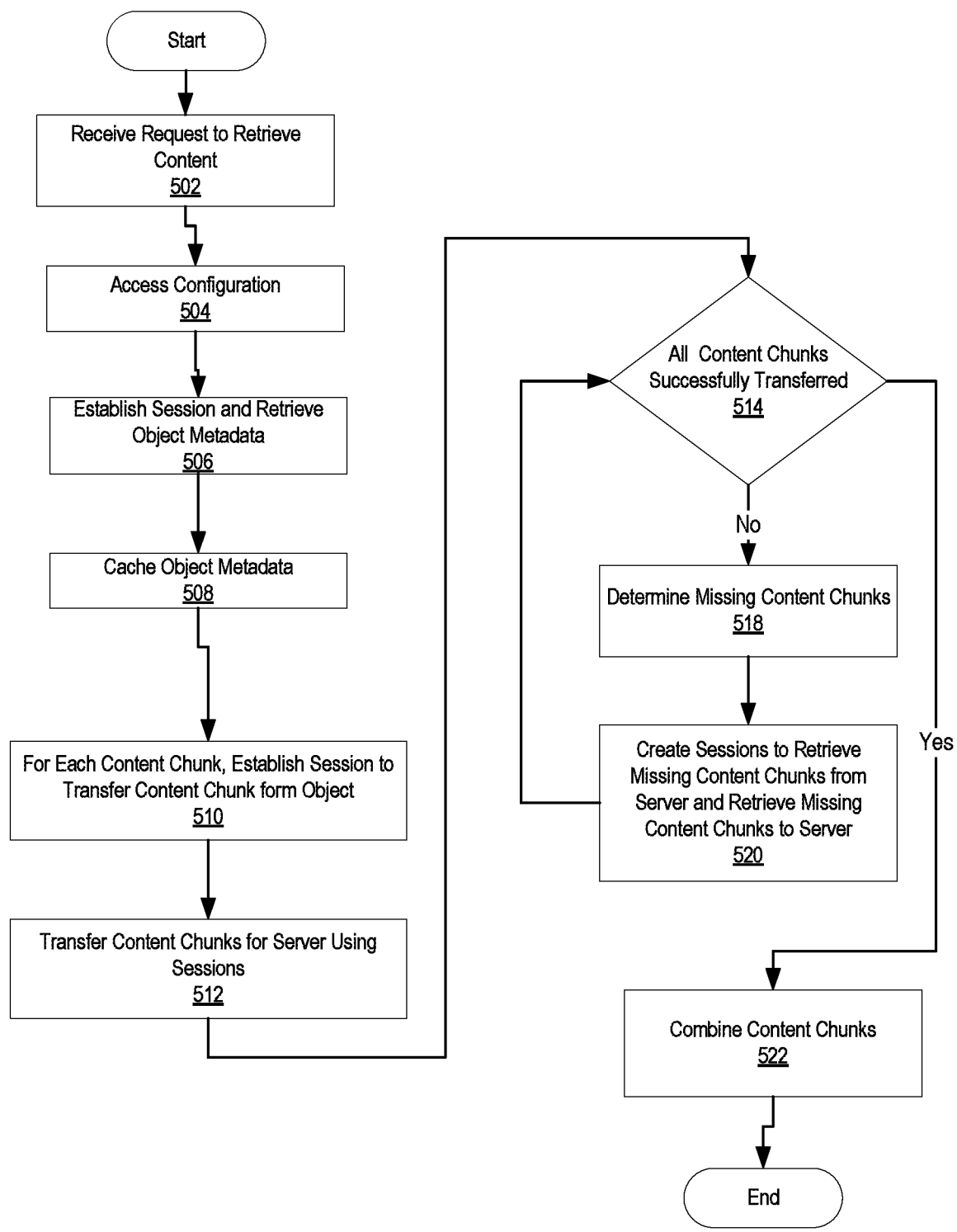
FIG. 5 is a flow chart illustrating one embodiment of retrieving content from the server.

FIG. 5 is a flow chart illustrating one embodiment of a method for parallel content transfer for retrieving content from a data store. One or more steps of FIG. 5 may be embodied as computer-executable instructions on a non-transitory computer-readable medium. One or more steps of FIG. 5 may be implemented by a content transfer system. By way of example, but not limitation, one or more steps of FIG. 5 may be performed by a client interface, such as client interface 120, 220.

At step 502, a client interface receives a request to retrieve a content item from a data store. The request may include, for example, an object id. The client interface accesses a configuration to determine a maximum number of sessions to use for the content transfer (step 504). The client interface establishes a first session to initiate transfer of the content item from a server associated with the data store and to transfer metadata for the content item. The client interface may provide for example an object id for a content object used to manage the content item.

The client receives object metadata associated with the object id from the server (step 506). In particular, the object metadata may include the size of the content item to be transferred (e.g., the size of the file), the chunk size and the number of chunks. The metadata may also include other metadata provided or determined for content item, such as a name, author or any other metadata. The client interface can cache the object metadata for later use (step 508).

At step 510, the client interface establishes parallel content transfer sessions, up to the maximum number of sessions (if any) specified by the configuration to transfer the n content chunks of the content item. The client interface retrieves the content chunks to the server using the parallel sessions (step 512). Once transfer of a content chunk is completed using a session, the session can be used to transfer another content chunk of the content item. In another embodiment, a new session is launched to transfer the next non-transferred content chunk. In other embodiments, the number of sessions is not limited by configuration and the client interfaces launches n content transfer sessions to transfer the n content chunks.

Each content transfer session transfers a content chunk and respective chunk metadata. The respective chunk metadata of each content chunk includes the chunk id for that chunk and an indication of the content object to which the chunk is to be stored. For example, the chunk metadata for a chunk may include an index value i (or another chunk id) and the object id returned by the server. The chunk metadata may also include other information, such as the size of the chunk.

Each content transfer session transfers a respective content chunk. According to one embodiment, the client interface provides, in each content transfer session, an indication of the content object from which the chunk is to be retrieved and the chunk id to be retrieved. For example, the client interface provides the content object's object id (or other indication of the object) and index value (or other chunk id) of the chunk to be transferred using a content transfer session and the content transfer session 234 transfers the respective content chunk. As discussed above in conjunction with FIG. 1, the server can use a data ticket associated with the object id and chunk id to locate the respective chunk in a file store for transfer.

When the content transfer sessions have completed transferring the content chunks or at the occurrence of some other predetermined event, the client interface determines if all the content chunks have been received (step 514). The client interface can compare a list of chunk ids for received chunks to the chunk ids received as part of the object metadata (e.g., the object metadata received in step 506) to identify missing content chunks (step 518). If any content chunks are missing, the client interface can launch sessions to retrieve the missing chunks based on chunk ids for the missing chunks (step 520).

In some embodiments, the client interface combines the downloaded content chunks into a completed content item and provides the complete content item to a client application (step 522). For example, the client interface may combine n.txt files (or other files) into a single .txt file (or other file format) and provide content item to client application as the combined text file. In other embodiments, the client interface provides content chunks to the client application on a chunk-by-chunk basis. For example, the client may be configured to view content on a page wise basis and the client interface can begin providing the content chunks of a requested content item to the client application as soon as the first chunk is retrieved, while a background number of sessions retrieve the rest of the content chunks.

FIG. 5 is provided by of example and not limitation. Various steps may be repeated, steps may be performed in different orders, steps omitted, and additional or alternative steps performed.

Figure 6:
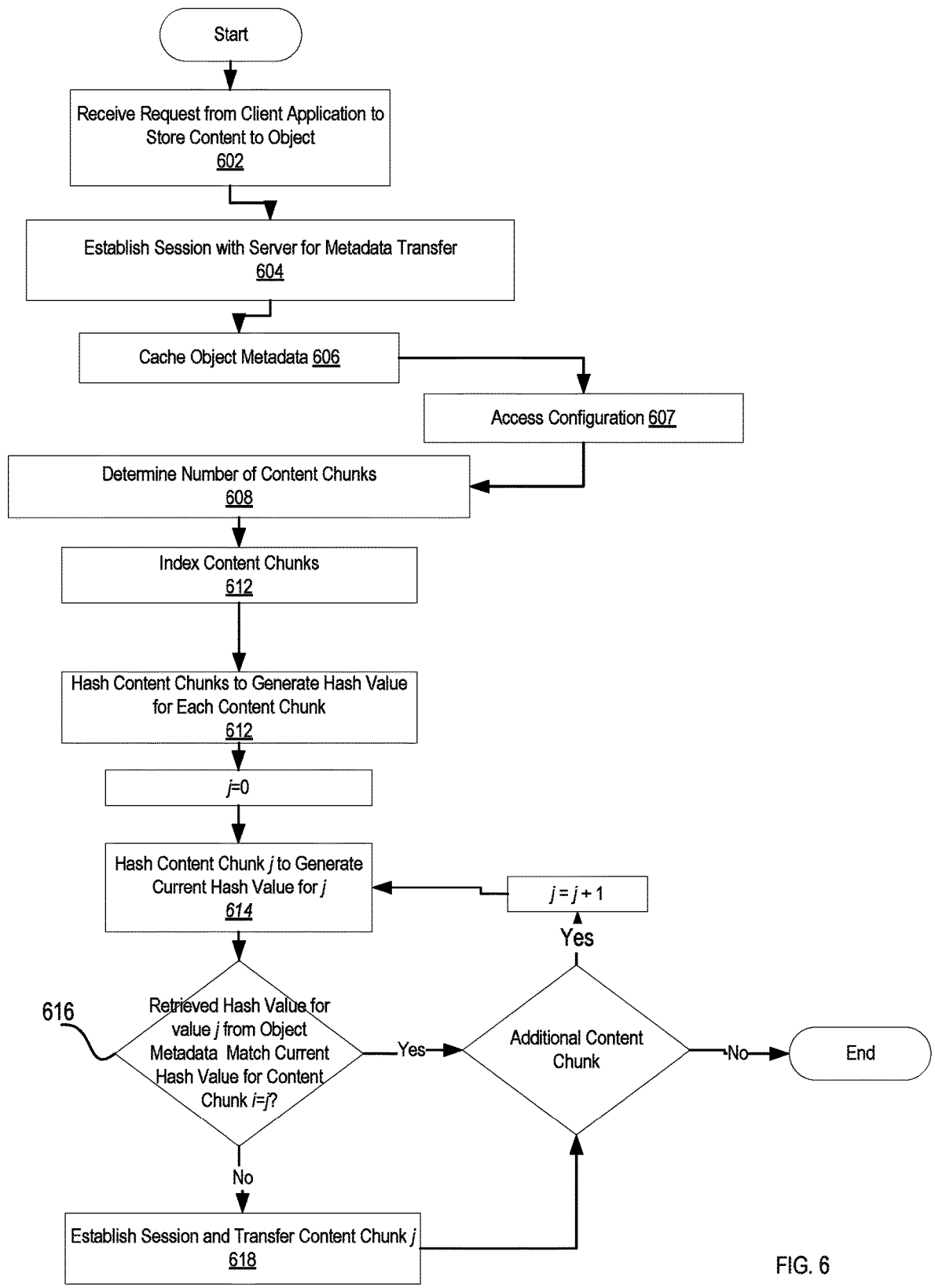
FIG. 6 is a flow chart illustrating one embodiment of transferring modified content to a server.

FIG. 6 is a flow chart illustrating one embodiment of a method for parallel content transfer to update content. One or more steps of FIG. 6 may be embodied as computer-executable instructions on a non-transitory computer-readable medium. One or more steps of FIG. 6 may be implemented by a content transfer system. By way of example, but not limitation, one or more steps of FIG. 6 may be performed by a client interface, such as client interface 120, 220.

At step 602, the client receives a request to store a content item to an existing content object. For example, the client interface receives a request to update a content item stored at data store with an updated content item (e.g., a request to store an updated version of a file to a content object).

At step 604, the client interface can establish a session with a server associated with the data store to retrieve object metadata for the content object, such as the number of chunks associated with the object and the hash values for each chunk. The client interface can cache the object metadata for later use (step 606). In other embodiments, the client interface will already have the object metadata cached (e.g., from steps 504, 506 performed when retrieving the prior version of the content item).

At step 607, the client interface accesses a configuration to determine the chunk size and the maximum number of sessions to use for the content transfer. The client interface further determines the number of content chunks to be transferred (step 608). For example, the client interface determines the size of the updated content item to be transferred (e.g., file size) and, based on the chunk size and size of the content item to be transferred, determines the number m of content chunks for the updated content item. At step 612, the client interface creates the m content chunks and assigns each content chunk a chunk id, such as an index value j, that is unique to that content chunk in the set of m content chunks created from the updated content item.

At step 614, the client interface hashes a content chunk j created from the updated content item. For example, client interfaces hashes content chunk 0 from the updated content item to create a current hash value for that content chunk. At step 616, the client interface compares the current hash value for content chunk 0 to the prior hash value for content chunk 0 retrieved from the server. For example, the client interface accesses the previously retrieved metadata for the content object to which the updated content item is to be stored to determine the prior hash value calculated by the server for the previously stored content chunk 0. If the current hash value for content chunk 0 matches the prior hash value for content chunk 0, this indicates that content chunk 0 has not been updated in the updated content item. According to one embodiment, the client interface does not transfer chunks that are determined not to have not been updated to the server.

If the current hash value for content chunk 0 matches the prior hash value for content chunk 0, this indicates that content chunk 0 has been updated in the updated content item. As such, the client interface can establish a content transfer session to transfer the updated chunk to the server. Steps 614-618 can be repeated for each content chunk of the updated content item. In the case where the updated content item is larger than the prior version of the content item and contains more chunks, the additional chunks can be considered updated chunks and transferred to the server.

In some embodiments, the client interface establishes a metadata transfer session to transfer metadata to the server using the session. By way of example, but not limitation, the client interface may use the session established at step 604 or establish another metadata transfer session. Such metadata may include the size of the updated content item (e.g., the size of the file), the chunk size and the number of chunks. The metadata may also include other metadata provided or determined for the updated content, such as a name, author or any other metadata.

While the transfer of updated content chunks is illustrated serially in FIG. 6 for the sake of explanation, other embodiments may transfer updated content chunks using parallel sessions. For example, the client interface may establish content transfer sessions up to the maximum number of sessions specified by the configuration to transfer the updated content chunks. Once transfer of a content chunk is completed using a session, the session can be used to transfer another content chunk of the updated content item. In another embodiment, a new session is launched to transfer the next non-transferred updated content chunk. In other embodiments, the number of sessions is not limited by the configuration and the client interface launches a content transfer session for each of the updated content chunks to be transferred.

Each content transfer session transfers an updated content chunk and respective chunk metadata. The respective chunk metadata of each content chunk includes the chunk id for that chunk and an indication of the content object to which the chunk is to be stored. For example, the chunk metadata for a chunk may include an index value (or other chunk id) and the object id or other indication of the content object to be updated. The chunk metadata may also include other information, such as the size of the chunk. In some embodiments, the chunk id or other content chunk metadata indicates that a content chunk is an updated content chunk. For example, if it is determined that content chunk 0 of an updated content item is an updated content chunk (e.g., the hash value for chunk 0 retrieved from the content object does not match the current hash value 0 for the chunk to be stored to the content object), then the chunk id for chunk 0 may be updated to 0_1 or other indication that the chunk being transferred is an update of an existing chunk. In another embodiment, the chunk metadata includes the index value for the chunk and the server determines that the chunk is an updated chunk based on the indicated content object already having a chunk for that index value. For example, if the server receives an update request associated with a content object and a content chunk with the index value "0", the server can determine that that the received content chunk is an updated version of content chunk 0. Similarly, the server can determine added content chunks. The server can store chunk metadata, including hash values for the updated content chunks, as part of the object metadata of the object.

FIG. 6 is provided by of example and not limitation. Various steps may be repeated, steps may be performed in different orders, steps omitted, and additional or alternative steps performed.

Figure 7:
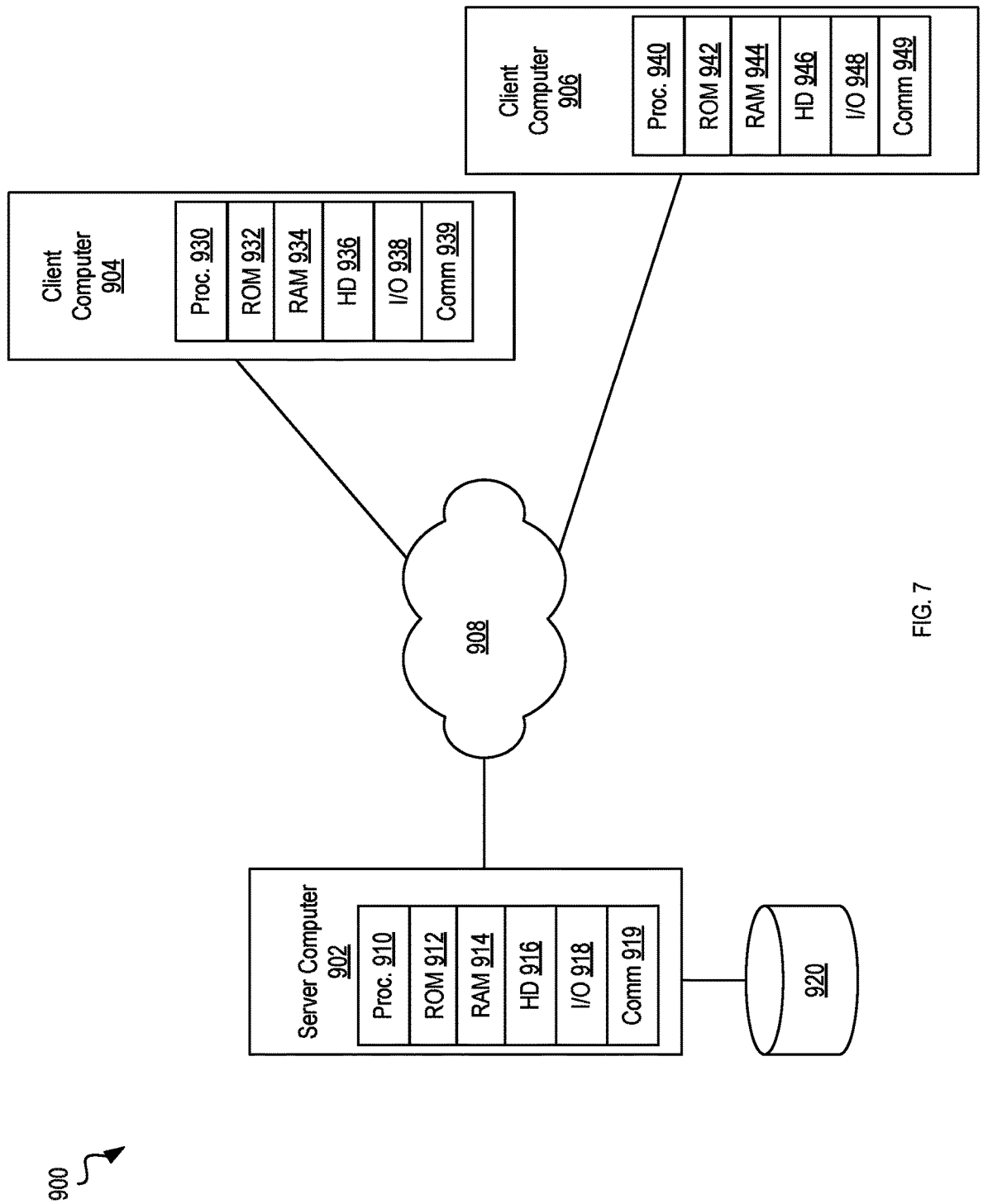
FIG. 7 is a block diagram of one embodiment of a computer system.

FIG. 7 is a diagrammatic representation of one embodiment of a distributed network computing environment 900. In the example illustrated, network computing environment 900 includes network 908 that can be bi-directionally coupled to a content management computer system 902 and client computers 904, 906. Network 908 may represent a combination of wired and wireless networks that network computing environment 900 may utilize for various types of network communications known to those skilled in the art. For the purpose of illustration, a single system is shown for each of content management computer system 902, and client computers 904, and 906. However, each of content management computer system 902, and client computer 904 and 906 may comprise a plurality of computers (not shown) interconnected to each other over network 908. Client computer systems 904, 906 may include data processing systems for communicating with computer 902.

Content management computer system 902 includes central processing unit ("CPU") 910, read-only memory ("ROM") 912, random access memory ("RAM") 914, hard drive ("HD") or storage memory 916, input/output device(s) ("I/O") 918 and communication interface 919. I/O 918 can include a keyboard, monitor, printer, electronic pointing device (e.g., mouse, trackball, stylus, etc.), or the like. Communications interface may include a communications interface, such as a network interface card, to interface with network 908. Content management computer system 902 may provide a variety of services to client computers 904, 906 over network 908. These services may utilize data stored in data store 920. According to one embodiment, content management computer system 902 may include computer executable instructions stored on a non-transitory computer readable medium coupled to a processor. The computer executable instructions of content management computer system 902 may be executable to provide a server (e.g., server 100, 200) to manage content and other content in a data store 920, which may comprise a file store and metadata store. In some embodiments, content management computer system 902 may also implement a client interface, such as client interface 120, 220.

Client computer 904 comprises CPU 930, ROM 932, RAM 934, HD 936, I/O 938 and communications interface 939. I/O 938 can include a keyboard, monitor, printer, electronic pointing device (e.g., mouse, trackball, stylus, etc.), or the like. Communications interface 939 may include a communications interface, such as a network interface card, to interface with network 908. Computer 906 may similarly include CPU 940, ROM 942, RAM 944, HD 946, I/O 948 and communications interface 949. According to one embodiment, one or more client computers 904, 906 can comprise a client application (e.g., client application 140, 240). In some embodiments, a client interface (e.g., client interface 120, 220) may be implemented on a client computer.

In one embodiment, client computers 904, 906 implement application servers. Distributed network computing environment 900 may thus further include end-user terminals (not illustrated) running end-user applications that connect via network 908 to the client applications of client computers 904, 906. In other embodiments, client computers 904, 906 may be end-user terminals.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 902, 904 and 906 is an example of a data processing system. ROM 912, 932, and 942; RAM 914, 934, and 944; HD 916, 936, and 946; and data store 920 can include media that can be read by CPU 910, 930, or 940. These memories may be internal or external to computers 902, 904, or 906.

Portions of the methods described herein may be implemented in suitable software code that may reside within ROM 912, 932, and 942; RAM 914, 934, and 944; HD 916, 936, and 946. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple database, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention.

Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer program product comprising a non-transitory computer readable medium, the computer readable medium having stored therein a set of computer readable instructions, including instructions for:
   receiving a request to store first content to a distributed data store;
   determining a size of the first content;
   determining a chunk size;
   determining a first plurality of content chunks to create based on the size of the first content and the chunk size and creating the first plurality of content chunks from the first content;
   assigning each content chunk in the first plurality of content chunks a chunk id that is unique to that content chunk in the first plurality of content chunks;
   communicating with a server to store the first content as an object in the distributed data store, the object comprising object metadata and associated content, the communicating with the server to store the first content comprising:
      establishing a first plurality of content transfer sessions with the server to transfer the first plurality of content chunks to the server for storage in the distributed data store as the associated content of the object, including establishing at least two parallel content transfer sessions to transfer at least two of the content chunks from the first plurality of content chunks to the server in parallel; and
      transferring each content chunk from the first plurality of content chunks and chunk metadata for that content chunk to the server using a corresponding content transfer session from the first plurality of content transfer sessions, the chunk metadata including the chunk id for that chunk and an indication of the object to which the chunk is to be stored;
   receiving a request to access the object;
   establishing a metadata transfer session with the server to transfer the object metadata from the server and receiving the object metadata from the server, the object metadata including a first set of hash values, the first set of hash values including a hash value generated from each content chunk in the first plurality of content chunks, each hash value in the first set of hash values having an associated hash value index value;
   receiving a request to store second content to the object;
   creating, from the second content, a first content chunk of the chunk size, assigning the first content chunk a first index value and generating a current hash value from the first content chunk;
   selecting a first hash value from the first set of hash values based on the associated hash value index value associated with the first hash value matching the first index value;
   comparing the first hash value to the current hash value generated from the first content chunk;
   based on a determination that the first hash value and the current hash value do not match, transferring the first content chunk to the server to store the first content chunk in the object; and
   based on a determination that the first hash value and the current hash value match, skipping the first content chunk.

2. The computer program product of claim 1, wherein assigning each content chunk in the first plurality of content chunks the chunk id that is unique to that content chunk comprises assigning each content chunk in the first plurality of content chunks an index value such that the first plurality of content chunks is associated with a set of consecutive index values.

3. The computer program product of claim 2, wherein the set of computer readable instructions further comprises instructions for:
   receiving, from the server, a second set of index values indicating content chunks from the first plurality of content chunks successfully stored as part of the object;
   based on identifying an index value included in set of consecutive index values but not in the second set of index values, determining a missing content chunk that was not successfully stored to the object; and
   establishing a content transfer session with the server for transferring the missing content chunk to the server and transferring the missing content chunk to the server.

4. The computer program product of claim 1, wherein the set of computer readable instructions further comprises instructions for:
   prior to establishing the first plurality of content transfer sessions, establishing a transfer initiation session associated with transferring the first content to the server;
   signaling the server, via the transfer initiation session, to create the object; and
   receiving from the server, via the transfer initiation session, an attribute of the object, wherein the indication of the object in the chunk metadata of each content chunk includes the attribute of the object.

5. The computer program product of claim 4, wherein the attribute of the object is an object id or a data ticket that maps to a directory location for storing the associated content of the object.

6. The computer program product of claim 1, wherein the server is adapted to store the first set of hash values in the object metadata.

7. A method comprising:
receiving, from a client application, a request to store first content to a distributed data store;
determining a size of the first content;
determining a chunk size;
determining a first plurality of content chunks to create based on the size of the first content and the chunk size and creating the first plurality of content chunks from the first content;
assigning each content chunk in the first plurality of content chunks a chunk id that is unique to that content chunk in the first plurality of content chunks;
communicating with a server to store the first content as an object in the distributed data store, the object comprising object metadata and associated content, the communicating with the server to store the first content comprising:
  establishing a first plurality of content transfer sessions with the server to transfer the first plurality of content chunks to the server for storage in the distributed data store as the associated content of the object, including establishing at least two parallel content transfer sessions to transfer at least two of the content chunks from the first plurality of content chunks to the server in parallel; and
  transferring each content chunk from the first plurality of content chunks and chunk metadata for that content chunk to the server using a corresponding content transfer session from the first plurality of content transfer sessions, the chunk metadata including the chunk id for that chunk and an indication of the object to which the chunk is to be stored;
receiving a request to access the object;
establishing a metadata transfer session with the server to transfer the object metadata from the server and receiving the object metadata from the server, the object metadata including a first set of hash values, the first set of hash values including a hash value generated from each content chunk in the first plurality of content chunks, each hash value in the first set of hash values having an associated hash value index value;
receiving a request to store second content to the object;
creating, from the second content, a first content chunk of the chunk size, assigning the first content chunk a first index value and generating a current hash value from the first content chunk;
selecting a first hash value from the first set of hash values based on the associated hash value index value associated with the first hash value matching the first index value;
comparing the first hash value to the current hash value generated from the first content chunk;
based on a determination that the first hash value and the current hash value do not match, transferring the first content chunk to the server to store the first content chunk in the object; and
based on a determination that the first hash value and the current hash value match, skipping the first content chunk.

8. The method of claim 7, wherein assigning each content chunk in the first plurality of content chunks the chunk id that is unique to that content chunk comprises assigning each content chunk in the first plurality of content chunks an index value such that the first plurality of content chunks is associated with a set of consecutive index values.

9. The method of claim 8, further comprising:
receiving, from the server, a second set of index values indicating content chunks from the first plurality of content chunks successfully stored as part of the object;
based on identifying an index value included in set of consecutive index values but not in the second set of index values, determining a missing content chunk that was not successfully stored to the object; and
establishing a content transfer session with the server for transferring the missing content chunk to the server and transferring the missing content chunk to the server.

10. The method of claim 7, further comprising:
prior to establishing the first plurality of content transfer sessions, establishing a transfer initiation session associated with transferring the first content to the server;
signaling the server, via the transfer initiation session, to create the object; and
receiving from the server, via the transfer initiation session, an attribute of the object, wherein the indication of the object in the chunk metadata of each content chunk includes the attribute of the object.

11. The method of claim 10, wherein the attribute of the object is an object id or a data ticket that maps to a directory location for storing the associated content of the object.

12. The method of claim 7, further comprising the server storing a first set of hash values in the object metadata.

13. A system for storing data comprising:
a distributed data store;
a client computer comprising a client application;
a content management computer system coupled to the distributed data store, the content management computer system comprising a server and a client interface, the client interface comprising instructions for:
  receiving a request from the client application to store first content to the distributed data store;
  determining a size of the first content;
  determining a chunk size;
  determining a first plurality of content chunks to create based on the size of the first content and the chunk size and creating the first plurality of content chunks from the first content;
  assigning each content chunk in the first plurality of content chunks a chunk id that is unique to that content chunk in the first plurality of content chunks;
  communicating with the server to store the first content as an object in the distributed data store, the object comprising object metadata and associated content, the communicating with the server to store the first content comprising:
    establishing a first plurality of content transfer sessions with the server to transfer the first plurality of content chunks to the server for storage in the distributed data store as the associated content of the object, including establishing at least two parallel content transfer sessions to transfer at least two of the content chunks from the first plurality of content chunks to the server in parallel; and
    transferring each content chunk from the first plurality of content chunks and chunk metadata for that content chunk to the server using a corresponding content transfer session from the first plurality of content transfer sessions, the chunk metadata including the chunk id for that chunk and an indication of the object to which the chunk is to be stored;

receiving a request from the client application to access the object;

establishing a metadata transfer session with the server to transfer the object metadata from the server and receiving the object metadata from the server, the object metadata including a first set of hash values;

receiving, from the client application, a request to store second content to the object, the second content being a modified version of the first content;

creating, from the second content, a first content chunk of the chunk size, assigning the first content chunk a first index value and generating a current hash value from the first content chunk;

selecting a first hash value from the first set of hash values based on an associated hash value index value associated with the first hash value matching the first index value;

comparing the first hash value to generated from the first content chunk;

based on a determination that the first hash value and the current hash value do not match, transferring the first content chunk to the server to store the first content chunk in the object; and based on a determination that the first hash value and the current hash value match, skipping the first content chunk; and the server comprising instructions for:

generating the first set of hash values from the first plurality of content chunks, the first set of hash values including a hash value generated from each content chunk in the first plurality of content chunks, the first set of hash values associated with a set of associated hash value index values; and storing the first set of hash values in the object metadata.

14. The system for storing data of claim 13, wherein assigning each content chunk in the first plurality of content chunks the chunk id that is unique to that content chunk comprises assigning each content chunk in the first plurality of content chunks an index value such that the first plurality of content chunks is associated with a set of consecutive index values, and wherein the client interface further comprises instructions for:

receiving, from the server, a second set of index values indicating content chunks from the first plurality of content chunks successfully stored as part of the object;

based on identifying an index value included in set of consecutive index values but not in the second set of index values, determining a missing content chunk that was not successfully stored to the object; and establishing a content transfer session with the server for transferring the missing content chunk to the server and transferring the missing content chunk to the server.

15. A computer program product comprising a non-transitory computer readable medium having stored therein a set of computer-readable instructions, including instructions for:

receiving a request to store first content to a distributed data store;

determining a size of the first content;

determining a chunk size;

determining a first plurality of content chunks to create based on the size of the first content and the chunk size and creating the first plurality of content chunks from the first content;

assigning each content chunk in the first plurality of content chunks a chunk id that is unique to that content chunk in the first plurality of content chunks;

communicating with a server to store the first content as an object in the distributed data store, the object comprising object metadata and associated content, the communicating with the server to store the first content comprising:

establishing a first plurality of content transfer sessions with the server to transfer the first plurality of content chunks to the server for storage in the distributed data store as the associated content of the object, including establishing at least two parallel content transfer sessions to transfer at least two of the content chunks from the first plurality of content chunks to the server in parallel; and transferring each content chunk from the first plurality of content chunks and chunk metadata for that content chunk to the server using a corresponding content transfer session from the first plurality of content transfer sessions, the chunk metadata including the chunk id for that chunk and an indication of the object to which the chunk is to be stored;

receiving a request to access the object;

establishing a metadata transfer session with the server to transfer the object metadata from the server and receiving the object metadata from the server, the object metadata including a first set of hash values, the first set of hash values including a hash value for each content chunk in the first plurality of content chunks;

receiving a request to store second content to the object, the second content being a modified version of the first content;

creating a second plurality of content chunks from the second content;

generating a second set of hash values, the second set of hash values including a hash value for each content chunk in the second plurality of content chunks;

determining which content chunks in the second plurality of content chunks are unmodified content chunks based on comparing the first set of hash values to the second set of hash values; and communicating with the server to store the second content to the object, the communicating with the server to store the second content to the object comprising establishing at least one session to transfer the content chunks from the second plurality of content chunks, other than the unmodified content chunks, to the server.

16. A method comprising:

receiving, from a client application, a request to store first content to a distributed data store;

determining a size of the first content;

determining a chunk size;

determining a first plurality of content chunks to create based on the size of the first content and the chunk size and creating the first plurality of content chunks from the first content;

assigning each content chunk in the first plurality of content chunks a chunk id that is unique to that content chunk in the first plurality of content chunks;

communicating with a server to store the first content as an object in the distributed data store, the object comprising object metadata and associated content, the communicating with the server to store the first content comprising:
- establishing a first plurality of content transfer sessions with the server to transfer the first plurality of content chunks to the server for storage in the distributed data store as the associated content of the object, including establishing at least two parallel content transfer sessions to transfer at least two of the content chunks from the first plurality of content chunks to the server in parallel; and
- transferring each content chunk from the first plurality of content chunks and chunk metadata for that content chunk to the server using a corresponding content transfer session from the first plurality of content transfer sessions, the chunk metadata including the chunk id for that chunk and an indication of the object to which the chunk is to be stored;

receiving a request to access the object;

establishing a metadata transfer session with the server to transfer the object metadata from the server and receiving the object metadata from the server, the object metadata including a first set of hash values, the first set of hash values including a hash value for each content chunk in the first plurality of content chunks;

receiving a request to store second content to the object, the second content being a modified version of the first content;

creating a second plurality of content chunks from the second content;

generating a second set of hash values, the second set of hash values including a hash value for each content chunk in the second plurality of content chunks;

determining which content chunks in the second plurality of content chunks are unmodified content chunks based on comparing the first set of hash values to the second set of hash values; and communicating with the server to store the second content to the object, the communicating with the server to store the second content to the object comprising establishing at least one session to transfer the content chunks from the second plurality of content chunks, other than the unmodified content chunks, to the server.

17. A system for storing data comprising:
a distributed data store;
a client computer comprising a client application;
a content management computer system coupled to the distributed data store, the content management computer system comprising a server and a client interface, the client interface comprising instructions for:
- receiving a request from the client application to store first content to the distributed data store;
- determining a size of the first content;
- determining a chunk size;
- determining a first plurality of content chunks to create based on the size of the first content and the chunk size and creating the first plurality of content chunks from the first content;
- assigning each content chunk in the first plurality of content chunks a chunk id that is unique to that content chunk in the first plurality of content chunks;
- communicating with the server to store the first content as an object in the distributed data store, the object comprising object metadata and associated content, the communicating with the server to store the first content comprising:
  - establishing a first plurality of content transfer sessions with the server to transfer the first plurality of content chunks to the server for storage in the distributed data store as the associated content of the object, including establishing at least two parallel content transfer sessions to transfer at least two of the content chunks from the first plurality of content chunks to the server in parallel; and
  - transferring each content chunk from the first plurality of content chunks and chunk metadata for that content chunk to the server using a corresponding content transfer session from the first plurality of content transfer sessions, the chunk metadata including the chunk id for that chunk and an indication of the object to which the chunk is to be stored;
- receiving a request to access the object;
- establishing a metadata transfer session with the server to transfer the object metadata from the server and receiving the object metadata from the server, the object metadata including a first set of hash values, the first set of hash values including a hash value for each content chunk in the first plurality of content chunks;
- receiving a request to store second content to the object, the second content being a modified version of the first content;
- creating a second plurality of content chunks from the second content;
- generating a second set of hash values, the second set of hash values including a hash value for each content chunk in the second plurality of content chunks;
- determining which content chunks in the second plurality of content chunks are unmodified content chunks based on comparing the first set of hash values to the second set of hash values; and
- communicating with the server to store the second content to the object, the communicating with the server to store the second content to the object comprising establishing at least one session to transfer the content chunks from the second plurality of content chunks, other than the unmodified content chunks, to the server; and the server comprising instructions for:
- generating the first set of hash values from the first plurality of content chunks, the first set of hash values including a hash value generated from each content chunk in the first plurality of content chunks, the first set of hash values associated with a set of associated hash value index values; and
- storing the first set of hash values in the object metadata.

* * * * *